United States Patent [19] [11] 3,874,883
Robitaille et al. [45] Apr. 1, 1975

[54] CORROSION INHIBITING PIGMENT AND METHOD OF MAKING SAME

[75] Inventors: Dennis R. Robitaille, Detroit; Mark S. Vukasovich; Henry F. Barry, both of Ann Arbor, all of Mich.

[73] Assignee: American Metal Climax, Inc., New York, N.Y.

[22] Filed: June 18, 1973

[21] Appl. No.: 370,825

Related U.S. Application Data

[63] Continuation-in-part of Ser. No. 269,508, July 6, 1972, abandoned.

[52] U.S. Cl. ............... 106/14, 106/288 B, 106/292, 106/306, 117/100 B
[51] Int. Cl. .................. C09C 1/02, C09C 1/04
[58] Field of Search ............... 106/308 B, 288 B, 14

[56] References Cited
UNITED STATES PATENTS
3,353,979 11/1967 Hann .................................. 106/292
3,726,694 4/1973 Moore et al. .................... 106/288 B Primary Examiner—Winston A. Douglas
Assistant Examiner—J. V. Howard
Attorney, Agent, or Firm—Harness, Dickey & Pierce

[57] ABSTRACT

A method for preparing an extended corrosion inhibiting pigment for use in formulating protective coatings for ferrous substrates in which a particulated carrier comprised of a carbonate of zinc, calcium, strontium and/or barium is slurred in an acidic aqueous solution in the presence of molybdic oxide in a manner to cause a reaction to occur between the molybdate ions and the metallic ions on the surface of the carrier particles forming a chemically bonded coating of the corresponding metal molybdate on the unreacted core of the carrier particles, whereafter the coated carrier is separated and dried.

10 Claims, No Drawings

CORROSION INHIBITING PIGMENT AND METHOD OF MAKING SAME

CROSS-REFERENCE TO RELATED APPLICATION

This application is a continuation-in-part of prior copending application Ser. No. 269,508, filed July 6, 1972, for "Molybdate Corrosion Inhibiting Pigment and Method for Preparing Same," now abandoned.

BACKGROUND OF THE INVENTION

Certain metal molybdate salts have been recognized for their ability to inhibit corrosion of ferrous substrates when incorporated as pigments in conventional and special coating formulations. Such metal molybdate pigments in addition to their excellent capacity to inhibit corrosion, also provide advantages over other more conventional corrosion inhibiting pigments in view of their neutral or white color, providing for increased latitude in the formulation of coating systems which are of comparatively light color. Additionally, the non-toxicity of such metal molybdate pigments enables unrestricted use thereof including areas and articles subject to human contact.

In spite of the foregoing advantages, the use of molybdate corrosion inhibiting pigments has been restricted due to their relatively high cost in comparison to other more common corrosion inhibiting pigments including, for example, zinc chromate, basic lead chromate, dibasic lead phosphite and the like. Attempts to effect a reduction in the cost of corrosion inhibiting molybdate pigments by forming physical mixtures of the metal molybdate compounds with inert extender materials has not been satisfactory in view of the necessity of incorporating upwards of 50% by weight of the active metal molybdate salt to achieve the required corrosion inhibiting properties. Such physical mixtures, in many instances, are still not competitively priced relative to the other more commonly used corrosion inhibiting pigments and, in some instances, such physically extended pigments have exhibited less than optimum corrosion inhibiting performance.

The present invention overcomes the cost and processing disadvantages heretofore associated with molybdate corrosion inhibiting pigments by providing a method in which a particulated carrier material is provided with a chemically bonded coating of a controlled amount of selected metal molybdae salts producing a non-toxic, colorless extended pigment which is competitively priced with other known corrosion inhibiting pigments and also provides for good dispersibility of the active molybdate constituent throughout a coating formulation.

SUMMARY OF THE INVENTION

The benefits and advantages of the present invention are achieved by a method whereby an economical and effective extended corrosion inhibiting pigment is produced in which the pigment particles are characterized as comprising a core of a selected metal carbonate having an adherent coating of a metal molybdate salt on the surfaces thereof. In accordance with the practice of the method comprising the present invention, a particulated reactive metal carbonate carrier is dispersed in an aqueous solution fluid or media in combination with a particulated molybdic oxide in a manner to effect a progressive dissolution of the molybdic oxide to supply soluble molybdate ions accompanied by a progressive dissolution of the surface of the carrier particles to supply metal ions for reaction with the molybdate ions and an evolution of carbon dioxide forming the corresponding aqueous solution insoluble metal molybdate salt. The metal molybdate salt precipitates on the surfaces of the carrier particles and/or is formed in situ producing a chemically bonded adherent coating on the unreacted cores of the carrier particles. The aqueous solution is preferably heated to accelerate the dissolution and reaction. The quantity of metal molybdate salt precipitated is usually controlled in an amount of from about 2% up to about 30% based on the total weight of the resultant corrosion inhibiting pigment.

At the conclusion of the reaction, the solid matter is separated from the residual aqueous solution and is preliminarily dried to remove the major portion of water therefrom, whereafter the dried and coated carrier is preferably subjected to a milling operation to break up any agglomerates formed during the coating operation. The drying and milling steps can be followed by calcining at an elevated temperature, generally ranging between about 350°C to about 600°C, to remove any residual entrained water and to further complete the reaction between the active constituents on the carrier particles.

It is also contemplated that certain finely particulated oxides; viz., zinc oxide, calcium oxide, strontium oxide, barium oxide and mixtures thereof, can be present in the slurry of carrier particles and which oxide particles become entrapped or are otherwise admixed with the coated pigment particles.

The process of the present invention, in addition to producing an effective and economical corrosion inhibiting pigment, provides the further advantage of not producing any polluting effluents which require special treatments prior to disposal. The filtrate or mother liquor containing residual unreacted molybdate ions is simply recovered and can be recycled for use in succeeding reactions.

Still further benefits and advantages of the present invention will become apparent upon a reading of the description of the preferred embodiments and the specific examples provided.

DESCRIPTION OF THE PREFERRED EMBODIMENTS

The quantity and concentration of the aqueous solutions, slurries and resultant corrosion inhibiting coating formulations are described in the specification and subjoined claims in terms of percentages by weight unless expressly indicated to the contrary.

The particulated extender or carrier material on which the metal molybdate compound is present in the form of a coating in controlled amounts may comprise any one or mixtures of certain metal carbonate compounds selected from the group consisting of calcium carbonate, zinc carbonate, barium carbonate and strontium carbonate. Lead carbonate can also be employed but is undesirable due to its toxicity. Calcium carbonate, including whiting and chalk, constitutes a particularly satisfactory carrier material in view of its low cost and the excellent corrosion inhibiting properties of the corresponding calcium molybdate reaction product.

The average particle size of the particulated carrier may broadly range from as low as about 0.1 micron up to about 25 microns, and preferably from about 0.2 micron to about 10 microns. The configuration of the carrier particles is not critical, although particle shapes are preferred which maximize surface area for a given weight quantity of carrier. The particular size and configuration of the carrier material employed is controlled for any given situation in consideration of such factors as the quantity of metal molybdate inhibiting salt that is to be coated on the cores of the carrier particles, the particular type and viscosity of the coating formulation in which the corrosion inhibiting pigment is to be dispersed, the concentration of the corrosion inhibiting pigment in the coating formulation, the type and amounts of other pigments present, the intended end use of the coating formulation and the like.

It will be apparent from the foregoing that optimum versatility is provided in accordance with the practice of the present invention when substantially non-toxic and colorless particulated carriers are employed, enabling unrestricted use of the corrosion inhibiting pigment in the formulation of white and other light-colored coating compositions, as well as dark-colored coating compositions, all of which are characterized as being substantially non-toxic.

The corrosion inhibiting molybdate salt, which is deposited or chemically formed in situ on the surfaces of at least a portion of the unreacted cores of the carrier particles, is comprised of a molybdate salt selected from the group consisting of zinc molybdate, calcium molybdate, strontium molybdate, barium molybdate and mixtures thereof, either alone or in further combination with a controlled quantity of the metal oxides of zinc, calcium, strontium, barium and combinations thereof. The presence of the metal oxides in the corrosion inhibiting molybdate coating is accomplished by adding and slurrying the finely particulated metal oxide in the reaction medium during the coating process as subsequently to be described.

Typically, the reaction for molybdic oxide and zinc carbonate in an aqueous medium to form the less soluble zinc molybdate salt is represented by the following equations:

$$MoO_3 + H_2O \rightarrow MoO_4^= + 2H^+$$

$$ZnCO_3 + 2H^+ \rightarrow Zn^{++} + H_2O + CO_2\uparrow$$

$$Zn^{++} + MoO_4^= \rightarrow ZnMoO_4$$

The reaction can be accelerated and driven toward completion by the application of heat and by agitating the aqueous reaction medium. The foregoing reaction equations represent a situation in which the zinc ions and molybdate ions are present in stoichiometric proportions which is typified by the condition in which zinc carbonate carrier is present in an amount to provide a residual unreacted core after all of the molybdic oxide has been consumed by the reaction. The addition of a metal oxide such as zinc oxide to the reaction medium results in an entrapment of the zinc oxide particles in the resultant metal molybdate corrosion inhibiting layers formed on the surfaces of the unreacted cores.

The reaction is carried out in a manner so as to form a coating or layer of the metal molybdate salt on the surfaces of the unreacted cores of the particulated carrier material from a minimum amount, which is established by that quantity at which a measurable increase is discernible in the corrosion inhibiting properties of a paint formulation incorporating significant portions of the pigment, to quantities of up to about 30% and even higher. Corrosion inhibiting molybdate pigments which incorporate quantities of the active molybdate salts greater than about 30%, based on the total weight of the pigment, have been found not to provide any appreciable advantages in comparison to similar pigments incorporating less than about 30% of the same active constituents and, accordingly, are less desirable in view of economic considerations. On the other hand, quantities of the corrosion inhibiting active constituents in amounts usually of at least about 2% have been found necessary to impart good corrosion inhibiting properties to a resultant paint formulation by providing an adequate supply of the molybdate constituents to combat corrosion of ferrous substrates over extended time periods. In accordance with the preferred practice, the metal molybdate salt is deposited on the carrier in an amount ranging from about 10% up to about 25% based on the total weight of the corrosion inhibiting pigment, whereby use of moderate quantities of such extended pigments in paint formulations, either alone or in combination with other pigment materials, has been found to provide satisfactory corrosion inhibiting performance in the vast majority of conditions.

In accordance with the process aspects of the present invention, an aqueous slurry is formed containing the particulated metal carbonate carrier which is subject to a high shear agitation to maintain a substantially uniform suspension of the solid particulate matter therein. Similarly, the molybdic oxide particles are preferably suspended in a separate aqueous slurry which is agitated and is slowly added to slurry containing the carbonate carrier particles. The molybdic oxide, while sparingly soluble in water, does progressively dissolve in accordance with the reaction equation previously set forth to produce the aqueous soluble molybdate ions ($MoO_4^=$). The dissolving of the molybdic oxide causes the molybdic oxide slurry to become acidic approaching a pH of about 2. The carbonate carrier slurry, on the other hand, is somewhat on the alkaline side approaching a pH of about 8. As previously mentioned, heating the slurry facilitates a dissolving of the reactive constituents and drives the reaction to completion so that temperatures ranging from about room temperature (20°C) up to the boiling point of the solution, and preferably from about 60°C to about 90°C are employed.

The concentration of the metal carbonate carrier particles in the aqueous slurry can range from as low as about 30% up to about 60%. Typically, the concentration of the carrier particles is controlled from about 40% up to about 50%, whereby a substantially uniform suspension is obtained employing moderate agitation and wherein the viscosity of the reaction medium is such that the desired quantities of molybdic oxide particles can concurrently be maintained in suspension for progressive dissolution and reaction. In those instances in which the molybdic oxide particles are directly added to the aqueous slurry containing the carrier particles, a control of the carrier particle concentration to a level at or below about 50% in combination with up to about 10% molybdic oxide particles assures that the concentration of particulate matter in the combined reaction slurry will not exceed about 60%. Conventionally, the molybdic oxide concentration in the reaction slurry will range from as low as about 2 % to as high as about 25%, which will vary depending upon the quantity of carbonate carrier particles present and the desired quantity of coating of metal molybdate to be applied on the unreacted particle cores.

As previously mentioned, it is preferred to initially disperse the desired amount of molybdic oxide particles in water, forming a separate slurry which can be progressively added to the carrier slurry at a rate sufficient to assure the presence of a sufficient quantity of molybdate ions to carry the reaction forward and to replenish the molybdate ions that are consumed in the reaction. The addition of the acidic molybdic oxide slurry to the alkaline carbonate carrier slurry results in some acidification thereof. The actual pH present at the interface of the metal carbonate core and the aqueous solution containing the molybdate ion is not known but believed in the range of from about pH 3 to about pH 6, which is conducive to a progressive dissolving of the metal carbonate salt on the particle surface, providing metal ions for reaction with the molybdate ions present.

It is also contemplated in accordance with the practice of the present invention that the reaction slurry may further contain metal oxide particles which do not appreciably enter into the reaction but become entrapped and/or bonded to the metal molybdate layer or coating formed on the residual unreacted particle cores. Metal oxides suitable for use are the same metals as those employed in the carbonate core including zinc oxide, calcium oxide, strontium oxide, barium oxide, as well as mixtures thereof. The inclusion of the foregoing metal oxides in the corrosion inhibiting pigments does not significantly affect the corrosion inhibiting properties thereof, but has been found to provide certain advantages, particularly in paint vehicle systems of the alkyd type with respect to the film hardening characteristics of the resultant coating formulation. While such metal oxides can also be subsequently added and mechanically blended to the coated corrosion inhibiting pigment, the inclusion of the metal oxide in the reaction slurry assures a more uniform distribution thereof throughout the pigment composition and also provides advantages over a pure mechanical mixture of the two components.

The molybdic oxide may comprise a substantially pure grade containing only minimal quantities of impurities, although technical grades containing as high as about 10% conventional impurities can also be satisfactorily employed in forming the reaction medium. In order to facilitate suspension and dissolution of the molybdic oxide, the particles should be of an average size less than about 25 microns and, preferably of an average size ranging from about 0.1 micron to about 10 microns. In the case of pure molybdic oxides produced by sublimation, the acicular crystalline structure maximizes surface area and the major dimension may, in some cases, exceed about 25 microns.

The metal oxide or mixture of metal oxides can be directly added to the aqueous slurry containing the suspended carrier particles. The quantity of metal oxide, if used, may range from about 0.5% up to about 10% based on the total pigment weight.

The metal oxide powder is of a particle size similar to that of the molybdic oxide and is controlled so that the average particle size is less than about 25 microns, and preferably less than about 10 microns. Its concentration in the reaction slurry is controlled in consideration of the other particulate matter present such that the total particle concentration does not exceed about 60% at which level undesirable high viscosities are usually encountered.

The reaction is carried out until substantially all of the molybdic oxide has been consumed and converted to the corresponding metal molybdate salt coating. During the course of the reaction, the aqueous slurry becomes more viscous and vigorous agitation is usually required, depending on the concentration of the several constituents, to assure uniformity of the reaction medium and a continuance of the reaction to completion. At the completion or substantial completion of the reaction, which is evidenced by the absence of any molybdate ions in the aqueous reaction solution, the solid matter is removed, such as by filtration, and the resultant filtrate or mother liquor is recycled for preparing a new aqueous reaction solution. The pH of the reaction slurry at the completion of the reaction is usually in the range of about 6.5 up to about 8. Usually, a continuation of the reaction for a period of about one hour after the last portion of the molybdic oxide has been added is adequate to assure completion of the reaction. The solid matter recovered comprising the coated carrier, together with any entrapped or admixed metal oxide and unreacted molybdic oxide particles, is preferably first subjected to a drying step, such as by heating to a temperature usually of from about 100°C to about 150°C, while in contact with circulating air to effect a removal of the major portion of residual water therefrom. Thereafter, the substantially dry particulated mass is subjected to a milling or pulverizing operation to effect a break up of any agglomerates that may have formed during the coating phase of the process and wherein substantially all of the resultant pigment is reduced in size to pigment grade.

The dried and milled corrosion inhibiting pigment can be subjected to a calcining step at an elevated temperature, which will range from a minimum, corresponding to that at which the water of hydration is removed, up to a maximum temperature below that at which a caking or fusion of the pigment particles occurs. Calcining of the pigment is usually desired if the pigment is to be employed in organic base coating formulations in which the presence of any residual entrapped water, and possibly, any water of hydration, is undesirable. When used in water-base paint formulations, the calcining step can usually be omitted without any adverse effects. Conventionally, calcining temperatures ranging from about 350°C to about 600°C have been found satisfactory for most coating compositions and carrier materials. The calcining operation is carried out for a period of time sufficient to effect a substantially complete removal of any entrapped water and water of hydration, and to further cause a completion of the reaction between the remaining residual active constituents. Generally, calcining time periods of around two hours at a temperature of about 400°C have been found satisfactory for this purpose. The resultant calcined corrosion inhibiting pigment can thereafter be directly used in the compounding of coating formulations which have been found to exhibit excellent corrosion inhibiting properties.

The corrosion inhibiting pigment prepared in accordance with the process of the present invention can be employed for compounding a variety of conventional as well as specialty type protective coating compositions or paints. The term "paint," as employed in the specification and subjoined claims, is used in its broad sense to include any one of a variety of solid and liquid mixtures consisting essentially of a binder having the solid extended corrosion inhibiting pigment dispersed therethrough, which, upon application to a substrate, is effective to form a thin protective film. In liquid paint systems, the vehicle comprises the liquid portion of the paint composition and may be composed of any one of the well known film-forming constituents or binders in combination with a volatile solvent or thinner, which is adapted to evaporate during the drying or curing of the paint film or, alternatively, in some instances, may itself react with the binder constituent and become an integral portion thereof. In accordance with known paint technology, the solvent or thinner may be omitted in those situations in which the paints or coating composition are of the hot-melt type, or wherein they are adapted to be applied to a substrate utilizing an electrostatic spray or powder spray technique in which the thinning effect of such solvents is usually unnecessary.

The specific type of binder material employed is not critical, provided that it is compatible with the corrosion inhibiting extended pigments, and may include any of those known in the coating art as being suitable for formulating protective coatings of the types heretofore known. Accordingly, the binder may be one which forms a resultant protective film by either oxidation or polymerization of the constituents. Typical of such binders are drying oils, including modified drying oils; formaldehyde condensation resins including phenolic, urea and triazine resins; allyl resins and polyurethane resins. The binder constituents may also comprise those which form a protective film as a result of the evaporation of the volatile solvent constituent of the liquid vehicle or by a congealing thereof from a hot-melt upon cooling. Typical examples of the foregoing binders are nitrocellulose and other cellulose esters and ethers of the types employed in lacquer formulations; vinyl resins, styrene resins, any one of a variety of the polyacrylates and polymethacrylates, rubber derivatives, polyamide resins and polyolefins, of which polyethylene is exemplary. Also applicable for use in accordance with the practice of the present invention are binders which form a film in response to a coagulation of the binder particles from a latex or dispersion of natural or synthetic binding agents in addition to resins, such as polytetrafluoroethylene and high molecular weight vinyl resins, including plastisols, which frequently require a subsequent heat treatment to effect a thermal fusion of the particles into a substantially continuous film. The corrosion inhibiting pigment of the present invention has been found to be particularly effective in water-base latex formulations incorporating acrylic polymers for forming corrosion inhibiting coatings.

It will be apparent from the foregoing that any one of a variety of binder constituents of the types well known in the art can be satisfactorily employed in combination with the extended corrosion inhibiting pigments of the present invention to provide for improved corrosion protection of ferrous substrates consistent with the particular article and corrosive environment to which it is to be subjected in order to provide for optimum protection. Of the large variety of suitable paint systems, organic coating systems, including an alkyd resin binding agent dispersed in a solvent in combination with the corrosion inhibiting pigment of the present invention, as well as other coloring and extender-type pigments, is perhaps the most common for use as protective coatings in industrial applications. Alkyd-type coating compositions of the aforementioned type include amine-modified alkyds including amine resins, such as urea and melamine resins. Epoxy and modified epoxy resins also provide excellent binder systems in which the extended corrosion inhibiting pigment of the present invention can be employed to advantage.

In order to still further illustrate the present invention and the excellent corrosion inhibiting properties achieved by the extended molybdate pigments, a series of typical paint formulations were prepared which were applied to test panels and evaluated under accelerated corrosion test conditions. It will be understood that the specific formulations prepared are merely illustrative and are not intended as being restrictive of the present invention as herein described and as set forth in the subjoined claims.

EXAMPLE 1

A series of four corrosion inhibiting molybdate pigments were prepared having a composition as set forth in Table 1.

TABLE 1

| Pigment Sample | Corrosion Inhibiting Extended Pigments | | | |
|---|---|---|---|---|
| | Parts by Weight | | | |
| | Metal Oxide | | Molybdate | Carrier |
| | ZnO | CaO | $MoO_3$ | $CaCO_3$ |
| P10 | 36.1 | | 63.9 | 400 |
| P11 | 53.1 | | 46.9 | 400 |
| P12 | 69.3 | | 30.7 | 400 |
| P13 | | 28.0 | 72.0 | 400 |

The pigment samples of Table 1 were prepared by forming aqueous slurries of the molybdic oxide and carrier material on one part and a metal oxide on the other part. The slurries are heated to a temperature of about 70°C. In the preparation of each pigment sample, the quantity of water required is approximately 1.5 liters per pound of final product produced. Upon attaining the reaction temperature of 70°C, the slurry containing the molybdic oxide is slowly added to the slurry containing the metal oxide and carrier particles. The liquid reaction medium is subjected to continued agitation and the temperature is maintained at about 70°C for a period of about one hour at which the reaction is substantially complete. The solids are then separated from the slurry by filtration. During the reaction, vigorous agitation is required to maintain a uniform suspension due to a considerable thickening effect occasioned by the dissolution and reaction of the materials. The separated solids are subjected to a preliminary drying at 110°C to remove the major portion of residual water entrapped therein, whereafter the dried material is subjected to a milling to reduce the particle size to pigment grade, whereafter the resultant milled pigment is subjected to a calcination step at about 550°C for a period of 8 hours.

The test pigments thus prepared are incorporated in a basic linseed base alkyd paint formulation comprising a roller paste component and a let-down component of compositions as set forth in Table 2.

TABLE 2

Basic Paint Formulations

| Roller Paste | Parts by Weight | | | |
|---|---|---|---|---|
| | RP1 | RP2 | RP3 | RP4 |
| Linseed Alkyd Solution | 480.0 | 480.0 | 480.0 | 480.0 |
| Raw Linseed Oil | 46.0 | 46.0 | 46.0 | 46.0 |
| Soya Lecithin | 8.0 | 8.0 | 8.0 | 8.0 |
| Aluminum Distearate | 6.0 | 6.0 | 6.0 | 6.0 |
| Montmorillonite Clay | 4.0 | 4.0 | 4.0 | 4.0 |
| Non-Chalk Rutile TiO$_2$ | 253.4 | 253.4 | 686.6 | 654.2 |
| Talc - Low Oil Absorptive | 253.2 | 164.6 | 287.0 | 287.0 |
| Talc - High Oil Absorptive | 34.6 | 119.0 | 138.0 | 138.0 |
| Subtotal | 1085.2 | 1081.0 | 1655.6 | 1623.2 |

| Let-Down | Parts by Weight |
|---|---|
| Linseed Alkyd Solution | 224.4 |
| Lead Drier, 24% | 18.0 |
| Manganese Drier, 6% | 6.0 |
| Cobalt Drier, 6% | 4.0 |
| Guaiacol (Technical Grade) | 4.0 |
| Mineral Spirits | 246.0 |
| | 502.4 |

As noted, four separate roller paste constituents, designated as RP1 through RP4, were prepared which deviate principally in the quantity of solid pigment contained therein. Test paint formulations were prepared having compositions as set forth in Table 3.

In each instance, the extended corrosion inhibiting pigment and/or miscellaneous pigment was incorporated in the roller paste component. The individual test paints were prepared on a three-roll mill to attain a Hegman grind of 5. As will be noted in Table 3, in addition to test paint formulations incorporating the various sample pigments prepared in accordance with the present invention, paint formulations incorporating several commercially available corrosion inhibiting pigments were also included for comparative purposes, in addition to corrosion inhibiting pigments comprising physical mixtures of zinc, calcium and strontium molybdate with talc.

The various constituents as listed in Tables 2 and 3, with the exception of the extended corrosion inhibiting

TABLE 3

Test Paint Formulations

| Component | Test Samples | | | | | | |
|---|---|---|---|---|---|---|---|
| | O | P | Q | R | S | T | V |
| Roller Paste | | | | | | | |
| Type | RP1 | RP1 | RP1 | RP1 | RP1 | RP1 | RP2 |
| Quantity | 1085.2 | 1085.2 | 1085.2 | 1085.2 | 1085.2 | 1085.2 | 1081.0 |
| Extended Pigment | | | | | | | |
| Type | P10 | P10 | P11 | P12 | P13 | P13 | |
| Quantity | 457.8 | 412.2 | 474.4 | 490.6 | 454.8 | 409.4 | |
| Miscellaneous Pigments | | | | | | | |
| Zinc Oxide | | 88.8 | | | | 88.8 | |
| Oncor M50 | | | | | | | 648.4 |
| Zinc Yellow | | | | | | | |
| Zinc Molybdate | | | | | | | |
| Calcium Molybdate | | | | | | | |
| Strontium Molybdate | | | | | | | |
| Zinc Phosphate | | | | | | | |
| Talc (Asbestine 325) | | | | | | | |
| Let Down | 502.4 | 502.4 | 502.4 | 502.4 | 502.4 | 502.4 | 502.4 |

| Component | Test Samples | | | | | | |
|---|---|---|---|---|---|---|---|
| | W | X | Z | AA | BB | CC | DD |
| Roller Paste | | | | | | | |
| Type | RP2 | RP3 | RP4 | RP1 | RP1 | RP1 | RP1 |
| Quantity | 1081.0 | 1655.6 | 1623.2 | 1085.2 | 1085.2 | 1085.2 | 1085.2 |
| Extended Pigment | | | | | | | |
| Type | | | | | | | |
| Quantity | | | | | | | |
| Miscellaneous Pigments | | | | | | | |
| Zinc Oxide | | | 60.8 | | | | |
| Oncor M50 | | | | | | | |
| Zinc Yellow | 547.2 | | | | | | |
| Zinc Molybdate | | | | 92.2 | | | |
| Calcium Molybdate | | | | | 92.0 | | |
| Strontium Molybdate | | | | | | 94.0 | |
| Zinc Phosphate | | | | | | | 516.8 |
| Talc (Asbestine 325) | | | | 368.4 | 367.8 | 376.4 | |
| Let Down | 502.4 | 502.4 | 502.4 | 502.4 | 502.4 | 502.4 | 502.4 | pigment of the present invention, comprise conventional ingredients employed in formulating coating compositions.

Among the miscellaneous pigments, Oncor M50 comprises a basic lead silico-chromate pigment. The Asbestine 325 pigment comprises talc available from International Talc Company having a degree of fineness wherein 99.95% passes through a 325-mesh screen and wherein the average particle size is about 4.6 microns.

The resultant paints were spray-coated on a minimum of six Type S (surface ground) 3-inch by 9-inch steel test panels to deposit a resultant film, after drying, of a thickness of 1.5 mils. At the completion of a seven-day drying cycle, the painted test panels were scored with a large X and subjected to a standard 5% salt-fog environment for periods of 160, 320 and 480 hours. At the completion of each test period, one panel, representative of each test paint formulation, was removed from the salt-fog chamber and the coating was stripped to enable an evaluation of the substrate for corrosion development. The results of these evaluations are tabulated in Table 4.

TABLE 4

Test Paint Pigmentation Performance Data

| Test Paint Code | Pigment | Salt-Fog Rating 160 Hours | 320 Hours | 480 Hours |
|---|---|---|---|---|
| O | ZnO/MoO$_3$/CaCO$_3$ | 9 | 8 | 7+ |
| P | ZnO/MoO$_3$/CaCO$_3$ | 9 | 8+ | 7+ |
| Q | ZnO/MoO$_3$/CaCO$_3$ | 9 | 8 | 7 |
| R | ZnO/MoO$_3$/CaCO$_3$ | 9 | 8 | 7+ |
| S | CaO/MoO$_3$/CaCO$_3$ | 8 | 8 | 6 |
| T | CaO/MoO$_3$/CaCO$_3$ | 8 | 8 | 7+ |
| V | Basic lead silico-chromate | 5 | 5 | 3 |
| W | Zinc yellow | 5 | 6 | 4+ |
| X | Titanium dioxide | 4 | 2 | 1 |
| Z | TiO$_2$ + 10% ZnO | 8 | 5 | 3+ |
| AA | ZnMoO$_4$/talc physical mixture | 5 | 4 | 3 |
| BB | CaMoO$_4$/talc physical mixture | 7 | 4 | 3+ |
| CC | SrMoO$_4$/talc physical mixture | 6 | 4 | 3+ |
| DD | Zinc phosphate | 7 | 4 | 3 |

The numerical rating employed is based on a scale where zero is a total failure of the protective coating, while 10 constitutes a perfect score. It will be apparent from the data accumulated on test paint samples O through T that the corrosion inhibiting pigment extended in accordance with the process of the present invention provided very favorable performance data. The physical addition of zinc oxide in combination with some of the extended molybdate pigments, as represented by test paint samples P and T evidence a slight improvement in some instances in the corrosion protection afforded. The corrosion inhibiting performance of test paint samples O through T, in most instances, exhibit a substantial improvement over the performance obtainable by using conventional commercially available corrosion inhibiting pigments, such as samples V, W and DD. In addition, the corrosion inhibiting performance of the test paints incorporating the molybdate pigment prepared in accordance with the present invention were substantially superior than that obtained by physical mixtures of the corresponding metal molybdate salts with talc, as evidenced by samples AA, BB and CC.

EXAMPLE 2

A series of three additional corrosion inhibiting pigments were prepared having a composition as set forth in Table 5.

TABLE 5

Corrosion Inhibiting Pigments

| Pigment Sample | Core | Percent of Total Pigment CaMoO$_4$ | ZnO |
|---|---|---|---|
| P14, P14C* | CaCO$_3$ | 13.5 | 10.9 |
| P15C* | CaCO$_3$ | 15.0 | — |
| P16 | CaCO$_3$ | 20.0 | — |

*calcined

The pigment samples were prepared in accordance with the general procedure in Example 1. The calcium carbonate core material was dispersed in an aqueous slurry at a concentration of 20% and the molybdic oxide was dispersed in a separate slurry at a high concentration enabling it to be progressively poured into the carrier slurry which was maintained in agitation. The reaction medium was held at about 70°C and total water content was about 1.5 liters. The reaction was continued for one hour after all of the molybdic oxide slurry had been added, whereafter the solid pigment was removed by filtration and dried at 110°C. Pigment samples P14C and P15C were calcined at 550°C for 16 hours.

The calcined pigment sample P14C was employed in preparing five linseed alkyd resin base coating formulations at pigment volume concentrations (PVC) of 30%, 38%, 44%, 47% and 50%. A similar series of formulations devoid of any molybdate pigment were prepared for comparative purposes in accordance with the composition as set forth in Table 6.

TABLE 6

Test Paint Formulations (Parts by Weight)

| | A-30 | A-38 | A-44 | A-47 | A-50 | B-30 | B-38 | B-44 | B-47 | B-50 |
|---|---|---|---|---|---|---|---|---|---|---|
| Pigment Volume Concentration (PVC) | 30% | 38% | 44% | 47% | 50% | 30% | 38% | 44% | 47% | 50% |
| Roller Paste | | | | | | | | | | |
| Linseed Alkyd Solution | 207.3 | 207.3 | 207.3 | 207.3 | 207.3 | 207.3 | 207.3 | 207.3 | 207.3 | 207.3 |
| Raw Linseed Oil | 46.3 | 32.4 | 25.2 | 22.3 | 19.8 | 46.3 | 32.4 | 25.2 | 22.3 | 19.8 |
| Soya Lecithin | 8.1 | 5.7 | 4.5 | 4.0 | 3.5 | 8.1 | 5.7 | 4.5 | 4.0 | 3.5 |
| Aluminum Distearate | 3.0 | 3.0 | 3.0 | 3.0 | 3.0 | 3.0 | 3.0 | 3.0 | 3.0 | 3.0 |
| Bentone 38 | 2.0 | 2.0 | 2.0 | 2.0 | 2.0 | 2.0 | 2.0 | 2.0 | 2.0 | 2.0 |
| Titanium Dioxide | 343.3 | 343.3 | 343.3 | 343.3 | 343.3 | 126.7 | 126.7 | 126.7 | 126.7 | 126.7 |
| P14C | — | — | — | — | — | 237.2 | 237.2 | 237.2 | 237.2 | 237.2 |
| Nytal 200 | 143.5 | 143.5 | 143.5 | 143.5 | 143.5 | 126.6 | 126.6 | 126.6 | 126.6 | 126.6 |
| Pfizer 10-52 | 69.0 | 69.0 | 69.0 | 69.0 | 69.0 | 17.3 | 17.3 | 17.3 | 17.3 | 17.3 |

TABLE 6—Continued

| | A-30 | A-38 | A-44 | A-47 | A-50 | B-30 | B-38 | B-44 | B-47 | B-50 |
|---|---|---|---|---|---|---|---|---|---|---|
| Test Paint Formulations (Parts by Weight) | | | | | | | | | | |
| Let-Down | | | | | | | | | | |
| Linseed Alkyd Solution | 502.5 | 289.0 | 179.8 | 135.8 | 96.9 | 502.5 | 289.0 | 179.8 | 135.8 | 96.9 |
| Lead Drier, 24% | 9.0 | 9.0 | 9.0 | 9.0 | 9.0 | 9.0 | 9.0 | 9.0 | 9.0 | 9.0 |
| Manganese Drier, 6% | 3.0 | 3.0 | 3.0 | 3.0 | 3.0 | 3.0 | 3.0 | 3.0 | 3.0 | 3.0 |
| Cobalt Drier, 6% | 2.0 | 2.0 | 2.0 | 2.0 | 2.0 | 2.0 | 2.0 | 2.0 | 2.0 | 2.0 |
| Guaiacol (Technical Grade) | 2.0 | 2.0 | 2.0 | 2.0 | 2.0 | 2.0 | 2.0 | 2.0 | 2.0 | 2.0 |
| Mineral Spirits | 123.0 | 123.0 | 123.0 | 123.0 | 123.0 | 123.0 | 123.0 | 123.0 | 123.0 | 123.0 |
| Total | 1464.0 | 1234.2 | 1116.6 | 1069.2 | 1027.3 | 1416.0 | 1186.2 | 1068.6 | 1021.2 | 979.3 |

The coating formulations were applied to test panels and subjected to a salt-fog environment as described in Example 1. The results are tabulated in Table 8.

Pigment samples P14C, P14, P15C and P16, as well as TiO$_2$ for comparative purposes, were employed in preparing a series of latex base water-type paints of a composition as set forth in Table 7. These coating formulations were applied to test panels and subjected to an accelerated salt-fog test as previously described and the results are also listed in Table 8.

It is apparent from a comparison of the ratings of the series B test paint formulations that the addition of the corrosion inhibiting pigment prepared in accordance with the present invention provides for a substantial improvement in the corrosion protection of a metal substrate in comparison to the same linseed-alkyd paint incorporating titanium dioxide pigment. The foregoing is particularly true at the 320 hour and 480 hour test times. Similarly, the corrosion inhibiting properties of the pigment of the present invention in aqueous acrylic

TABLE 7

| | Paint Formulations | | | | |
|---|---|---|---|---|---|
| | C | D | E | F | G |
| Grind Paste | | | | | |
| Water | 174.6 | 241.3 | 174.6 | 241.3 | 241.3 |
| Dispersant-Tamol 731 | 44.9 | 34.5 | 44.9 | 34.5 | 34.5 |
| Wetting Agent-Triton CF-10 | 10.0 | 7.7 | 10.0 | 7.7 | 7.7 |
| Antifoamer-Nopco NXZ | 10.0 | 7.7 | 10.0 | 7.7 | 7.7 |
| Ethylene Glycol | — | 76.7 | — | 76.7 | 76.7 |
| Hydroxy Ethyl Cellulose, 2½% in water | 298.0 | 225.4 | 298.0 | 225.4 | 225.4 |
| Non-Chalk Rutile Titanium Dioxide | 959.4 | 764.3 | 959.4 | 764.3 | 1045.4 |
| Mica-325 Mesh Water Ground | — | 90.3 | — | 90.3 | 90.3 |
| Mica-4x Size Range | 117.9 | — | 117.9 | — | — |
| Calcium Carbonate-Suspenso | — | — | — | 435.0 | — |
| Calcium Carbonate-Atomite | 568.8 | 444.9 | 568.8 | — | 444.9 |
| Zinc Oxide | 27.7 | 21.3 | 27.7 | 21.3 | 21.3 |
| Corrosion Inhibiting Pigment | 258.6 | 203.6 | 243.6 | 146.4 | — |
| Let-Down | | | | | |
| Acrylic Emulsion Vehicle-Rhoplex MV-1 | 2725.7 | 2085.2 | 2725.7 | 2085.2 | 2085.2 |
| Tributyl Phosphate | 22.7 | 17.2 | 22.7 | 17.2 | 17.2 |
| Preservative-Skane M-8 | 9.1 | 6.8 | 9.1 | 6.8 | 6.8 |
| Antifoamer-Nopco NXZ | 10.0 | 7.7 | 10.0 | 7.7 | 7.7 |
| Ammonium Hydroxide - 28% | — | 6.4 | — | — | 7.6 |
| Hydroxy Ethyl Cellulose, 2½% in water | 140.6 | — | 140.6 | — | — |
| Ethylene Glycol | 99.8 | — | 99.8 | — | — |

TABLE 8

| Test Paint Formulation | Pigment | Salt-Fog Rating | | |
|---|---|---|---|---|
| | | 160 Hour | 320 Hour | 480 Hour |
| B-30 | P14C | 9 | 7 | 5 |
| B-38 | P14C | 8 | 8 | 7 |
| B-44 | P14C | 9 | 9 | 9 |
| B-47 | P14C | 8 | 9 | 9 |
| B-50 | P14C | 10 | 9 | 9 |
| A-30 | TiO$_2$ | 9 | 2 | 1 |
| A-38 | TiO$_2$ | 6 | 2 | 1 |
| A-44 | TiO$_2$ | 6 | 2 | 1 |
| A-47 | TiO$_2$ | 4 | 2 | 1 |
| A-50 | TiO$_2$ | 3 | 2 | 1 |
| C | P14C | 8 | 7 | 7 |
| D | P14 | 9 | 8 | 7 |
| E | P15C | 9 | 7 | 7 |
| F | P16 | 10 | 9 | 8 |
| G | TiO$_2$ | 8 | 5 | 4 | latex paint systems is particularly pronounced as evidenced by the salt-fog ratings as set forth in Table 8 in which each of test paint formulations C-F provide for a significant improvement over the same latex coating formulations containing only titanium dioxide.

In addition to the corrosion inhibiting molybdate pigments prepared in accordance with Examples 1 and 2, suitable pigments can also be prepared in accordance with the following additional examples.

EXAMPLE 3

A pigment is prepared employing the procedure as described in Examples 1 and 2 by forming an aqueous slurry of a carrier material comprised of equal proportions of zinc carbonate and calcium carbonate, to which a separate aqueous slurry containing molybdic oxide is progressively added, forming thereby a mixed zinc molybdate and calcium molybdate corrosion inhibiting pigment.

EXAMPLE 4

A corrosion inhibiting pigment is prepared as in Example 3 employing a strontium carbonate carrier material.

EXAMPLE 5

A pigment is prepared as in Example 3 employing a barium carbonate carrier material.

EXAMPLE 6

A pigment is prepared as in Example 3 employing equal parts by weight of a calcium carbonate, zinc carbonate, strontium carbonate and barium carbonate carrier material.

EXAMPLE 7

A pigment is prepared as in Example 3 but in which the aqueous slurry further contains a particulated metal oxide powder comprising a mixture of zinc oxide, calcium oxide, strontium oxide and barium oxide present in an amount 5% based on the total weight of the coated pigment produced.

EXAMPLE 8

A corrosion inhibiting pigment is prepared as in Example 3 in which the carrier material comprises a mixture of equal parts of calcium carbonate and lead carbonate.

While it will be apparent the invention herein disclosed is well calculated to achieve the benefits and advantages as hereinabove set forth, it will be appreciated that the invention is susceptible to modification, variation and change without departing from the spirit thereof.

What is claimed is:

1. A method for making an extended corrosion inhibiting pigment which comprises the steps of forming a slurry by dispersing a particulated metal carbonate carrier selected from the group consisting of zinc carbonate, calcium carbonate, strontium carbonate, barium carbonate and mixtures thereof in an aqueous medium, dispersing particulated molybdenum oxide in said slurry in a manner to effect a progressive dissolution thereof to produce solution soluble molybdate ions and a progressive dissolution of the surfaces of the metal carbonate carrier particles to produce solution soluble corresponding metal ions, said metal carbonate carrier present in an amount stoichiometrically in excess of the soluble molybdate ions present to provide residual unreacted cores of solid particulated carrier and to provide an acidic aqueous reaction medium having a pH less than about 6, reacting said molybdate ions and said metal ions to produce solution insoluble metal molybdate compounds as an adherent coating on the surfaces of said particulated carrier, continuing the reaction until the desired quantity of said coating has been deposited on the unreacted cores of said particulated carrier, separating the coated said carrier from said solution, and thereafter drying the coated said carrier for a period of time sufficient to remove substantially all of the entrained moisture therein.

2. The method as defined in claim 1, including the further step of heating said aqueous solution and maintaining the temperature thereof within a range of from about 60°C to about 90°C during said reaction.

3. The method as defined in claim 1, including the further step of vigorously agitating said aqueous solution during said reaction to maintain a substantially uniform suspension of said particulated carrier and said molybdenum oxide in said solution.

4. The method as defined in claim 1, including the further step of suspending said molybdic oxide in water to form a slurry and thereafter introducing said slurry into said aqueous solution containing said particulated carrier.

5. The method as defined in claim 1, wherein the coated said carrier is subjected to a preliminary drying step after separation from said solution to remove the predominant quantity of water therefrom whereafter the dried and coated said carrier is milled to eliminate any agglomerates therein whereafter the dried, coated and milled said carrier is calcined at an elevated temperature for a period of time sufficient to remove any residual water and water of hydration.

6. The method as defined in claim 1, wherein the reaction is carried out to deposit from about 2% up to about 30% of said metal molybdate compounds on said particulated carrier based on the total weight of said pigment.

7. The method as defined in claim 1, including the further step of calcining the dried coated said carrier at an elevated temperature of from about 350°C up to about 600°C.

8. The method as defined in claim 1, including the further step of dispersing a particulated metal oxide selected from the group consisting of zinc oxide, calcium oxide, strontium oxide, barium oxide and mixtures thereof, in said aqueous solution for admixture with said carrier and entrapment in said coating thereon, said metal oxide present in an amount of about 0.5% to about 10% based on the total weight of said pigment.

9. The method as defined in claim 1, wherein said particulated carrier is of an average particle size ranging from about 0.1 micron to about 20 microns.

10. A corrosion inhibiting molybdate pigment prepared by the process as defined in claim 1.

* * * * *